Oct. 18, 1927.
R. MILLER
1,645,814
SPRAY ATTACHMENT FOR HOSE NOZZLES
Filed Oct. 22, 1925
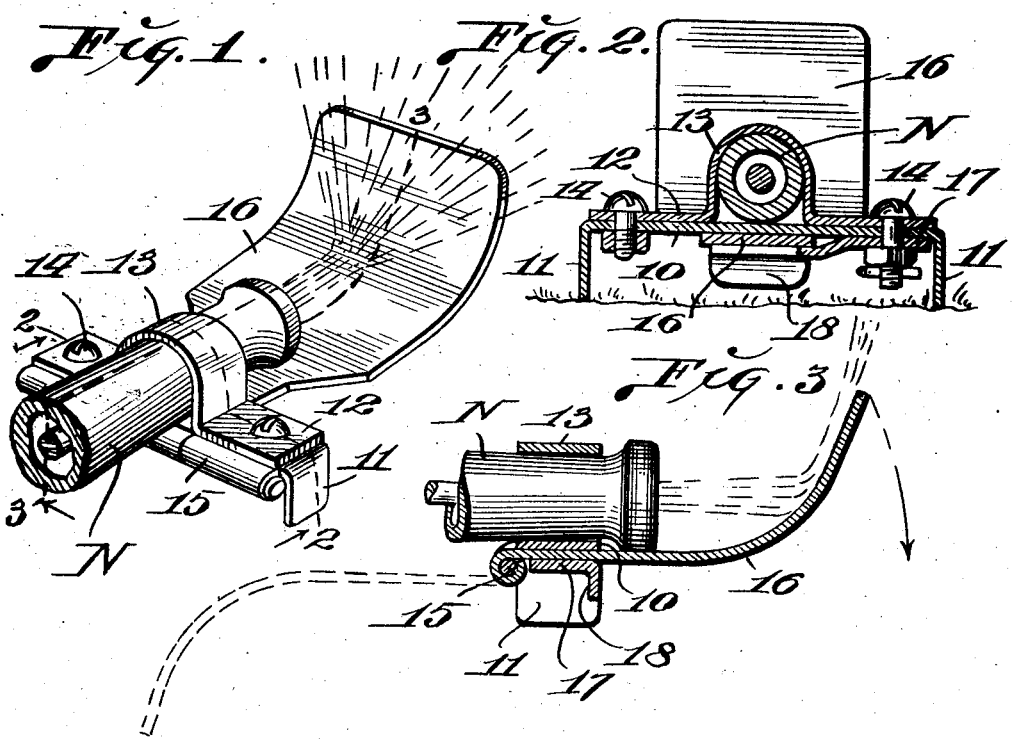
Inventor:—
Ralph Miller.
By Martin P. Smith
atty.

Patented Oct. 18, 1927.

1,645,814

UNITED STATES PATENT OFFICE.

RALPH MILLER, OF LOS ANGELES, CALIFORNIA, ASSIGNOR TO HAROLD H. GUNNELL.

SPRAY ATTACHMENT FOR HOSE NOZZLES.

Application filed October 22, 1925. Serial No. 64,132.

My invention relates to a spray attachment for hose nozzles, and the construction herein disclosed is an improvement on a similar device forming the subject matter of my co-pending application filed August 13, 1925, Serial No. 50,014.

The principal objects of my invention are, to generally improve upon and simplify the construction of the spray attachment disclosed in my aforesaid co-pending application; to provide a device of the character referred to that may be easily and cheaply produced and readily applied to or removed from practically all forms of hose nozzles; to arrange the spray producing plate or deflector so that it may be readily shifted into and out of spraying position, and further, to provide a spray attachment for hose that will be very effective in performing its intended functions.

With the foregoing and other objects in view, my invention consists in certain novel features of construction and arrangement of parts that will be hereinafter more fully described and claimed and illustrated in the accompanying drawings in which:

Fig. 1 is a perspective view of a spraying device of my improved construction applied to a hose nozzle.

Fig. 2 is a cross section taken on the line 2—2 of Fig. 1.

Fig. 3 is a longitudinal section taken approximately on the line 3—3 of Fig. 1.

Referring by numerals to the accompanying drawings, 10 designates a base plate, the ends of which are bent downward to form short legs 11, and overlying said base plate is a top plate 12, the central portion of which is bent to form an inverted U-shaped member 13 that is adapted to receive a hose nozzle such as N.

Passing through the end portions of plates 10 and 12 are fastening devices such as bolts or screws 14, which when secured firmly clamp the attachment to a hose nozzle, with the latter passing through inverted U-shaped member 13.

Connected by a hinge 15 to the rear edge of plate 12 is the rear end of a deflector plate 16, the forward portion of which is curved upwardly, so as to occupy an inclined position directly in front of the discharge end of nozzle N when in spraying position.

Arranged beneath plate 10 and pivotally connected to one of bolts 14 is a latch or keeper 17, the free end of which is adapted to underlie the rear portion of plate 16 when the latter is in spraying position. Keeper 13 is provided on one of its edges with a depending lip or flange 18 that is engaged by the thumb and finger when said keeper is swung into or out of latching position.

When my improved spray attachment is applied to a hose nozzle and plate 16 is swung into position in front of nozzle N and latched in such position by keeper 17, the jet of water issuing from the nozzle strikes against the upwardly curved portion of plate 16 and is deflected in spray form upwardly and outwardly in fan-shape over a considerable area of the lawn or ground adjacent to the hose nozzle, thereby achieving the desired results. When the nozzle with the attachment thereon is placed on the lawn or ground, it is maintained at a slight elevation by the legs 11.

When it is desired to use the hose nozzle without spraying, the water jet issuing therefrom, latch 17 is released and plate 16 is swung downwardly and rearwardly into the position as shown by dotted lines in Fig. 3. Thus the flow of the water jet from the nozzle is free and unobstructed.

Thus it will be seen that I have provided a relatively simple, practical and convenient spray attachment for hose nozzles, that is arranged so that it may be readily shifted into or out of spraying position, thereby enabling the nozzle to be used in the ordinary manner to disengage a solid jet of water or to cause said jet to be deflected in spray form over a considerable area of lawn or ground.

It will be understood that minor changes in the size, form and construction of the various parts of my improved spray attachment for hose nozzles may be made and substituted for those herein shown and described, without departing from the spirit of the invention, the scope of which is set forth in the appended claims.

I claim as my invention:

1. The combination with a hose nozzle, of a two part clamp detachably applied to said nozzle, the end portions of the lower member of said two part clamp being bent downwardly to form short supporting legs for the nozzle when the same is placed on the ground, a curved deflector plate hinged to the rear edge of the lower member of said two part clamp and adapted to swing from a spraying to a nonspraying position and vice versa and a latch plate pivotally mounted on the underside of the two-part clamp adjacent to one end thereof and adapted to be swung into position beneath the rear portion of the curved deflector plate to lock the same in spraying position.

2. The combination with a hose nozzle, of a two part clamp detachably applied to said nozzle, the end portions of the lower member of said two part clamp being bent downwardly to form short supporting legs for the nozzle when the same is placed on the ground, a curved deflector plate hinged to the rear edge of the lower member of said two part clamp and adapted to swing from a spraying to a nonspraying position a latching plate pivotally mounted on the underside of the two-part clamp adjacent to one end thereof and adapted to be swung into position beneath the rear portion of the deflector plate to lock the same in spraying position and a lip depending from said latching plate, which lip is adapted to be engaged by the thumb and finger when the latching member is manipulated.

In testimony whereof I affix my signature.

RALPH MILLER.